June 30, 1936.　　　E. E. COTANCH　　　2,045,584
AUTOMATIC TRANSMISSION
Filed Aug. 26, 1931　　　4 Sheets-Sheet 1

INVENTOR
*Earl E. Cotanch.*
BY
ATTORNEYS

June 30, 1936.  E. E. COTANCH  2,045,584
AUTOMATIC TRANSMISSION
Filed Aug. 26, 1931  4 Sheets-Sheet 3

INVENTOR
Earl E. Cotanch.
BY
ATTORNEYS

June 30, 1936.  E. E. COTANCH  2,045,584
AUTOMATIC TRANSMISSION
Filed Aug. 26, 1931  4 Sheets-Sheet 4

INVENTOR
Earl E. Cotanch.
BY
ATTORNEYS.

Patented June 30, 1936

2,045,584

UNITED STATES PATENT OFFICE 2,045,584

AUTOMATIC TRANSMISSION

Earl E. Cotanch, Los Angeles, Calif., assignor to Automatic Rotary Transmission Co., a corporation of California Application August 26, 1931, Serial No. 559,562

42 Claims. (Cl. 74—259)

This invention relates to an automatic transmission, and particularly to one adapted for use in an automobile.

Heretofore, automatic transmissions have embodied differential mechanisms for transmitting power from a drive shaft to either a driven shaft or a drag producing device. The devices used to produce the drag or resistance have been inertia drag members, friction mechanisms, or other devices of a type which are not adapted to transmit the power stored therein to the driven shaft.

An object of this invention is to provide an automatic transmission in which the power is transmitted either through the direct driving mechanism or to another mechanism which transmits practically all of the power transmitted thereto to the driven shaft.

A further object of the invention is to provide an automatic transmission free from oscillating parts so as to have a quiet and smooth action, and in which internal shifting mechanisms, ratchets, and objectional internal locking devices are eliminated.

It is still a further object of the invention to provide a simple, effective means for reversing the drive.

It is an object of my invention to provide a mechanism adapted to be used as a brake as well as for a transmission and adapted to be used in reverse for providing an especially heavy braking force.

The invention has as another object, the elimination of the necessity of disengaging a clutch in the driving mechanism to enable the driven shaft to rotate slower than or faster than the drive shaft.

It is still another object of the invention to provide a transmission having the inertia of the parts thereof adapted to cause the mechanism to vary the gear ratio with respect to the load on and the speed of the driven shaft as desired.

Another very important object of the invention is to provide a transmission mechanism in which the housing and other parts of the mechanism rotate with the drive shaft to eliminate friction.

A specific purpose of the invention is to provide a cushioning effect between the motor and the driven shaft.

Other objects of the invention are clearly brought out in the following detailed description.

In carrying the invention into practice, a drive shaft 1 is employed provided with an enlarged squared portion 70 for holding the spindle 4 rigid thereon. Two spiral helical type gears 6 are pinned to sleeves 3 of identical inertia members 7 and are free to rotate therewith on said spindle and same are interposed between bearings 8 and 9 on said spindle, and confined upon said spindle by retaining nuts 10.

A spiral helical type gear 11 is meshed with the gears 6, and same is free to rotate on the aforementioned drive shaft and to rotate in a bearing 12 and rigidly connected with the gear 11 is a helical gear 13. A larger helical type gear 14 intermeshes with gear 13 and is keyed to countershaft 15. Plates 16, 17, and 18 mounted on bearings 19, 12, and 20, respectively, are bolted to cylindrical members 21 and 22 and the same form a rotary housing. Bearings 23 and 24 are counter-sunk in plates 17 and 18, and journaled therein is a shaft 15 which is parallel to the drive shaft. Carried by shaft 15 and keyed thereto is a small helical gear 25 which meshes with a larger helical gear 26, the latter being free to rotate on a sleeve 27 and same is pinned to a male or external gear 28. A female or internal sliding gear 29 has interfitting connection with the aforementioned gear 28, and the same also intermeshes with a male gear 30 which latter is keyed to said sleeve 27. At this point it should be noted that the sleeve 27 is carried by and is keyed to the driven shaft 2. When the sliding gear 29 is in the position shown in Figure 2, an operative power transmission mechanism is provided from the gear 11 through the mechanism just described to the driven shaft 2 in a low gear ratio.

Figure 5:
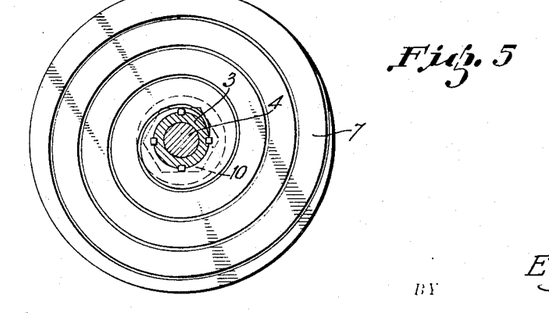
Figure 5 is a view on line 5—5 of Figure 4.

Two spiral helical gears 5 are pinned to inertia members 77 and are free to rotate therewith on sleeves 3, and are held between bearings 78 and 79. The aforesaid housing is filled with oil. An oil groove is provided on adjacent faces of inertia members 7 and 77. The preferred form of the construction of such an oil groove is illustrated in Figure 5. The inertia members are spaced to provide an operative friction oil film between their adjacent surfaces. A spiral helical gear 31 intermeshes with gears 5 and is free to rotate on shaft 1 and, as illustrated, is fixed to the plate 16 in order that it will rotate with the housing. When the housing rotates and the heretofore described mechanism is stationary with respect thereto, and assuming that the sliding gear 29 is in the position shown in Figure 2, it manifestly follows that the driven shaft 2 is compelled to rotate therewith and in a direct drive.

Figure 3:
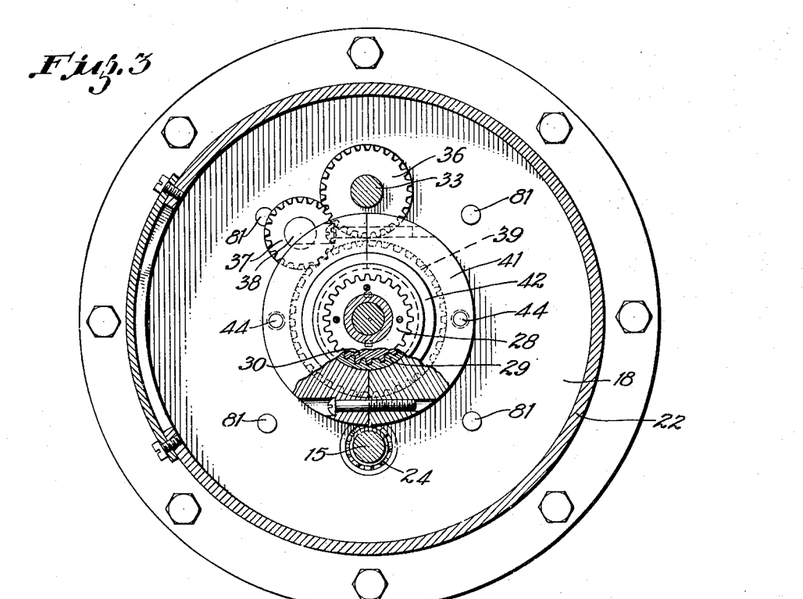
Figure 3 is a sectional view on line 3—3 of Figure 2.

A helical gear 32 intermeshes with smaller gear 13 and is keyed to countershaft 33, which shaft is supported in plates 17 and 18 by bearings 34 and 35 respectively. A helical gear 36 is also keyed to shaft 33 and reverse idler gear 37 shown in Figure 3 intermeshes with gear 36 and is supported on plate 18 by shaft 38. Helical gear 39 intermeshes with gear 37 and is free to rotate on sleeve 27. Male gear 40 is pinned to gear 39 and adapted to fit female sliding gear 29. When gear 29 is moved toward gear 39 releasing gear 28 and engaging gears 40 and 30, a reverse transmission mechanism is provided from the gear 11 to driven shaft 2 in a low gear ratio.

The sliding gear 29 is shorter than gear 30 so that it may be placed in a position on gear 30 so as to be out of engagement with gears 28 and 40. When in this position the driven shaft is disengaged from and free to rotate with respect to the described transmission mechanisms.

An internal plate 41 is confined between shoulders 42 on gear 29 and gear 29 is free to rotate therein. An external plate 43 is free to slide on shaft 2 and shaft 2 is free to rotate therein. The plates 41 and 43 are held in relative spaced relation by rods 44 which fit slidably in holes in plate 18.

A male gear 45 is pinned to stationary part 46. A sliding female gear 47 is fitted over male gear 45. Another male gear 48 is pinned to plate 16 and adapted to fit the sliding female gear 47. An arm 49 is rigidly attached to female gear 47. Rod 50 is rigidly attached to arm 49 and slides through a hole in arm 51. Arm 52 is rigidly attached to rod 50 and has a portion thereof confined in groove 53 of plate 43. Rod 54 is rigidly attached to arm 49 and provides means for moving the gear locking mechanism.

Figure 4:
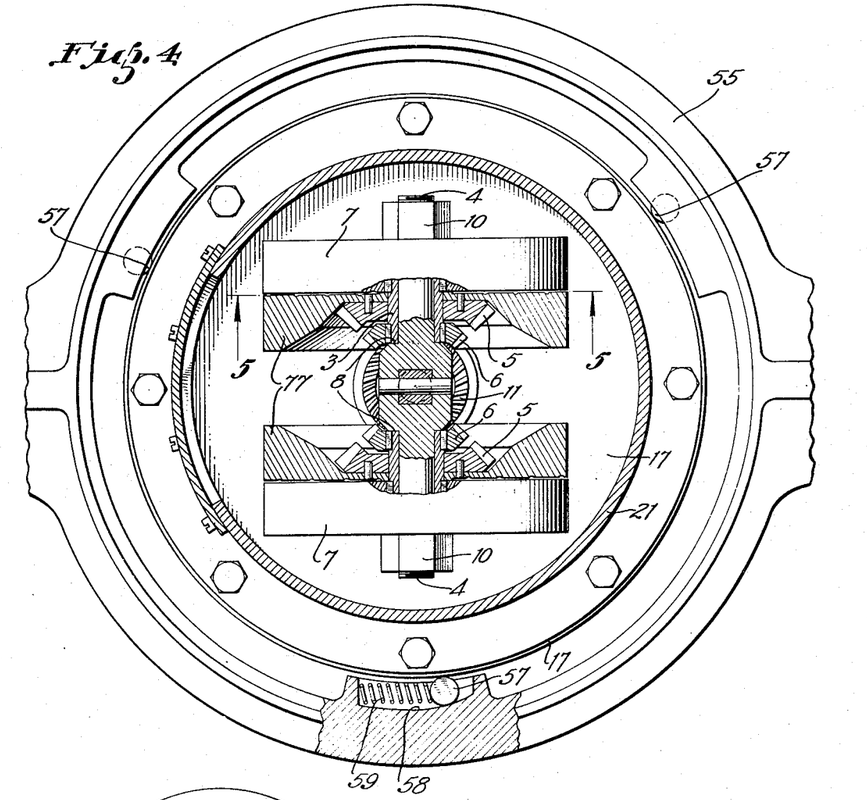
Figure 4 is a sectional view on line 4—4 of Figure 2.

A ring 55 is held stationary by arms 51 and 56. Rollers 57 are positioned in races 58 of ring 55 and are forced into contact with plate 17 by springs 59. As shown in Figure 4 races 58 are adapted to cause rollers 57 to lock plate 17 from rotating counter-clockwise.

Male cones 80 are keyed to countershafts 15 and 33. Studs 81 are screwed into plate 18. Plate 82 is slidable on studs 81 and shaft 2 is free to rotate therein. Female cones 83 are pinned to plate 82 and are adapted to fit male cones 80. Arm 84 is joined to brake 65 by rod 85 which extends slidably through a hole in arm 56.

When the drive shaft is rotated and there is no load on the driven shaft, the inertia of members 7 and 77 is sufficient to cause the whole transmission to rotate rather than overcome the resistance to rotation of these members about their axis. In this case, as previously described, the driven shaft will rotate at the same rate as the drive shaft. The inertia of all parts of the rotating transmission tend to cause the transmission to remain in this condition of direct drive. The transmission is enabled to drive against a relatively heavy load before overcoming the total inertia necessary to cause initial relative rotation of the parts which is necessary to cause a lowering of the gear ratio. The momentum of all the parts revolving about the shaft acts to overcome in direct drive any sudden loads imposed on the driven shaft.

As loads greater than the maximum high gear loads are applied to the driven shaft, the gears 6 are able to move the gear 11 easier than the gears 5 are able to move the gear 31 because gear 11 is part of the low gear drive and gear 31 is part of the high gear drive. This causes the gears 6 and the inertia members 7 to rotate faster than and in a different direction than the gears 5 and the inertia members 77 so as to cause a portion of the power to be transmitted through the low gear mechanism. The initial force necessary to overcome the resistance to rotation of the members 7 and 77 about their axis tends to resist this transfer of power to the low gear mechanism and tends to hold the mechanism in high gear. The resistance of the friction oil film between the inertia members also acts to hold the mechanism in high gear. This frictional resistance causes a uniform force to be exerted on gear 11 and gear 31. The speed of rotation of the driven shaft is reduced by the application of the heavier load. The force produced by the change in momentum of all the parts of the transmission rotating with the driven shaft acts in a direct drive to tend to overcome the heavier load. The gear 31 rotates at the slower speed of the driven shaft, and therefore at a much less speed than the gear 11. The force applied on the gear 31 is transmitted to the driven shaft in a high gear ratio, and the force applied to the gear 11 is transmitted to the driven shaft in a low gear ratio. As the speed of the driven shaft is slowed down by a heavy load, the force transmitted through the low gear mechanism becomes greater and the force transmitted through the high gear mechanism becomes less. However, since the frictional force between the inertia members reacts to drive the respective gear mechanisms, at all times substantially the full energy on the drive shaft is transmitted through the two mechanisms and is only divided to automatically regulate the force applied to the driven shaft in proportion to the load placed thereon.

A very heavy load on the driven shaft acts through the described direct drive mechanism to inertia member 77. The load also acts through the described low gear mechanism in the direction from the driven shaft to inertia member 7, and therefore in a high gear ratio. The resultant of a heavy load applied to the driven shaft is therefore applied to inertia member 7 with a much less force than to inertia members 77. This action causes the housing to tend to rotate oppositely to the drive shaft.

Figure 6:
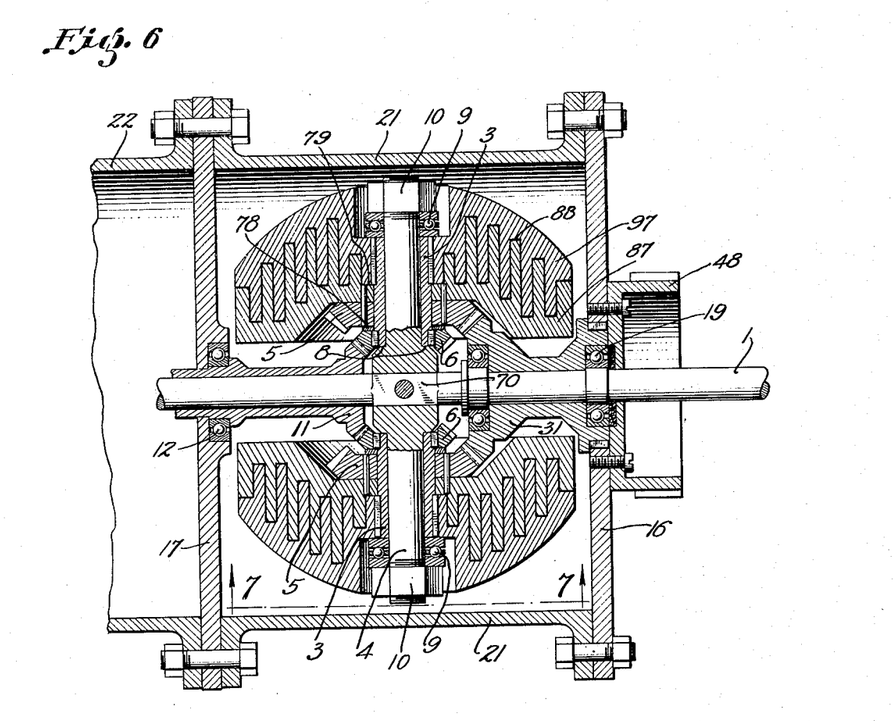
Figure 6 is a fragmentary sectional view showing a variational form of inertia member.
Figure 7:
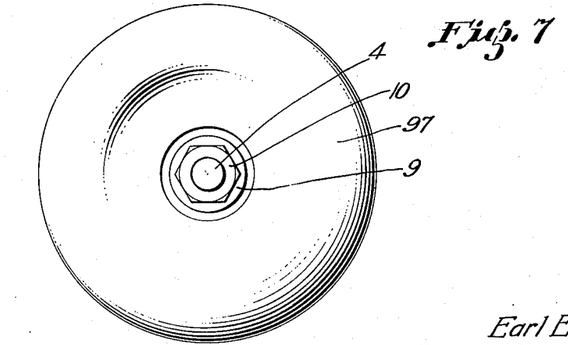
Figure 7 is a view on line 7—7 of Figure 6.

If allowed to rotate backwards, the transmission would idle and avoid moving heavy loads. The locking mechanism provided by the ring 55 and the rollers 57 automatically locks the mechanism against backward rotation. When thus locked and a driving speed of the engine is maintained, the transmission acts against the load utilizing the full effect of the frictional oil film, which, with the inertia members properly adjusted, acts against the load with substantially the power of a solid shaft in low gear. A variational form of inertia members adapted to be used in mechanisms for transmitting very heavy loads is illustrated in Figures 6 and 7. Inertia members 87 and 97 are provided with mating annular projections and grooves which define a frictional oil film 88 having a very large area.

Figure 1:
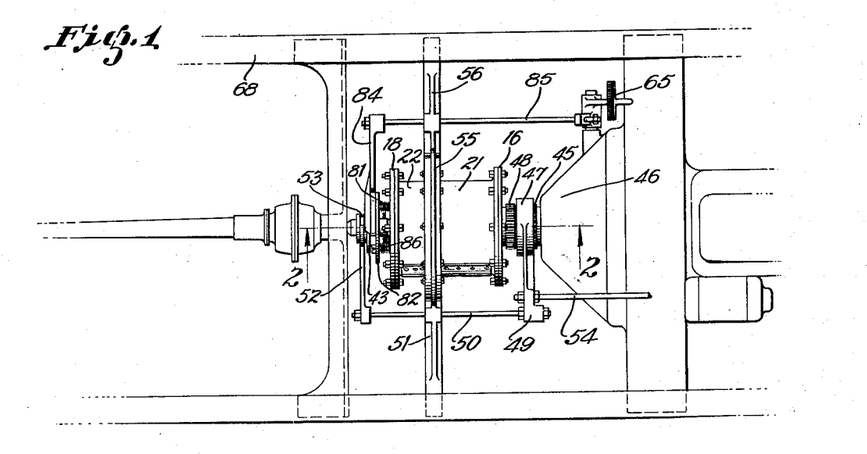
Figure 1 is a plan view of the automatic transmission mounted in an automobile.

To further illustrate the use of the invention, I will now describe the operation of the same in an automobile without the use of a clutch. The transmission is mounted on the frame 68 of an automobile as shown in Figure 1. I will first describe the operation of an automobile with the female gear 29 in the position shown in Figure 2.

When the car is standing still, the engine may be started at a low starting engine speed because it is possible for the engine to drive the inertia members against the resistance of the oil film. When thus operating, the mechanism may be said to be in a state of inertia neutral.

To drive the car forward, the engine is accelerated bringing into action the aforementioned driving force of the transmission.

As the automobile gains momentum, the heavy force which has been tending to reverse the housing, is soon sufficiently lightened to be less than that exerted by gears 5 thereon. The housing will then start to rotate and the power of the drive shaft will be transmitted partially through the high gear mechanism. The kinetic energy of rotation of members 7 and 77 about the drive shaft is at all times available to drive gears 11 and 31.

As the automobile approaches a high gear speed, a point of equilibrium is reached in the transmission and the inertia members cease to rotate about their axis. Then the entire transmission rotates as a unit to provide a direct drive in high gear.

When the automobile is traveling at a high gear speed and the supply of fuel to the engine is reduced, the momentum of the automobile will cause a force to be exerted on the driven shaft tending to rotate it faster than the drive shaft. A relative slippage of the inertia members occurs producing an initial effect similar to that of free wheeling. The resistance of the frictional oil film which comes into action as the speed of the driven shaft increases with respect to the engine, brings into action the braking force of the compression of the engine in a very soft manner. The transmission accomplishes the advantages of free wheeling together with the desirable features of compression.

Figure 2:
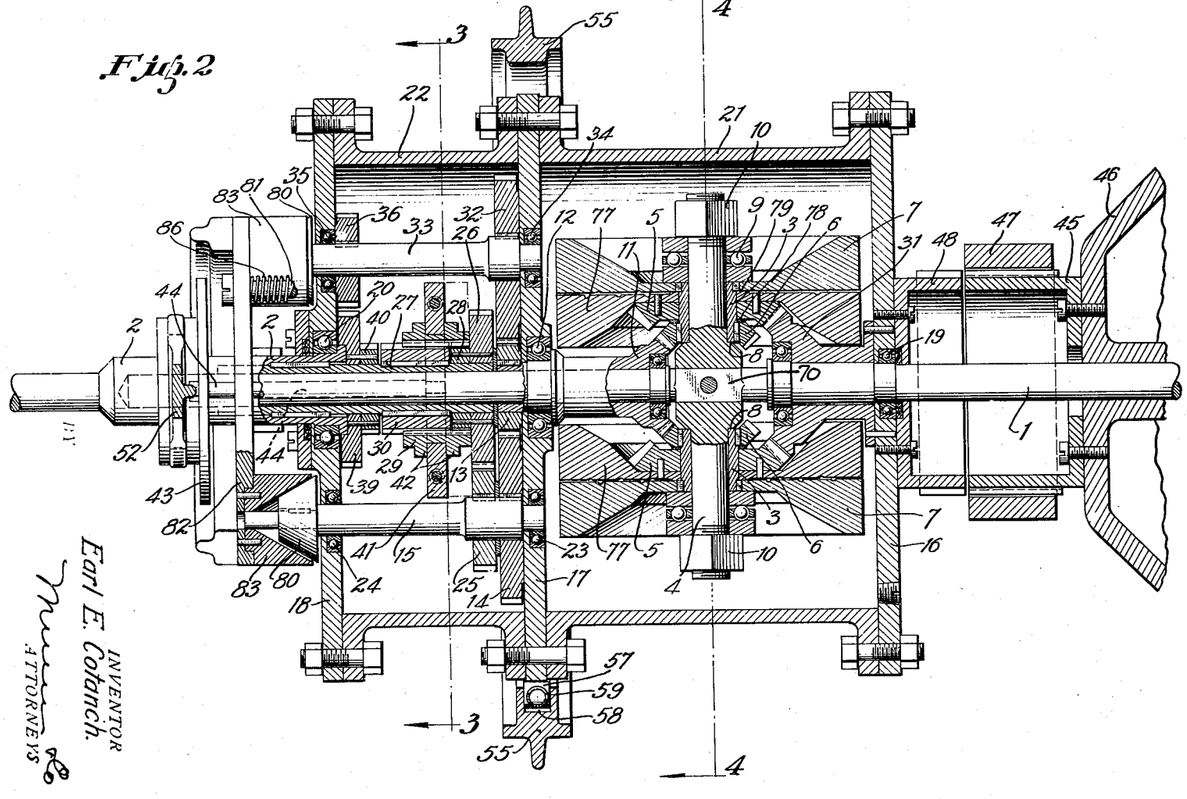
Figure 2 is a sectional view on line 2—2 of Figure 1.

I will now describe the operation when the female gears 29 and 47 are used in positions other than that shown in Figure 2. When it is desired to use the compression of the engine as a braking force in low gear, the rod 54 is moved to cause the female gear 47 to engage male gear 48 but not far enough to cause the female gear 29 to disengage the gear 28. Then the braking force of the compression of the engine is transmitted to the drive shaft in a low gear ratio because the direct drive mechanism is held stationary.

The automobile is placed in an ordinary neutral by moving the rod 54 so that the female gear 29 rests entirely on the gear 30.

Before sliding female gear 29 into engagement with one of the male gears that is rotated with respect thereto, the rod 85 is moved to cause female cones 83 to engage male cones 80 retarding the rotation of countershafts 15 and 33 sufficiently to facilitate the meshing of the gears. When not used for this purpose, cones 83 are held out of engagement with cones 80 by the action of the springs 86. To reverse the automobile, the rod 54 is moved so that the female gear 29 engages the gear 40. When in reverse, any desired amount of braking force to a forward motion of the automobile may be obtained by regulating the speed of the engine.

I have selected and arranged the parts of the mechanism so as to provide a very desirable functioning of the same in automatically transmitting power in an automobile. Mechanisms may be designed to make use of some of the features of this invention without regard to inertia friction considerations. However, the desired regulation of the gear ratio with respect to velocity and loads can, in my opinion, best be obtained by the use of parts having the proper inertia and friction.

It is to be understood that features of the invention are to apply to power transmission devices wherever they may be used, and particularly in motor vehicles, lathes, oil drilling and mining machinery, drills, power boats, turbines, presses, brakes, pumps and wherever a drive shaft and driven shaft is used.

While I have described preferred forms of the invention, it is to be understood that the drawings and the description thereof are to be considered as illustrative of, rather than limitative upon, the broader claims because it will be apparent to those skilled in the art that changes in the mechanism may be made without departing from the scope of this invention.

I claim:

1. In an automatic transmission, a drive shaft, a driven shaft, a spindle solid on the drive shaft, a pair of adjacent inertia members positioned on one side of the drive shaft and being adapted to rotate about the axis of the spindle and relative to each other, a driving mechanism operatively connected to the driven shaft, means providing operative connection between one of the inertia members and the driving mechanism, and means providing operative connection between the other one of the inertia members and the driving mechanism.

2. In an automatic transmission, a drive shaft, a driven shaft, a spindle solid on the drive shaft, a pair of adjacent inertia members positioned on one side of the drive shaft and being adapted to rotate about the axis of the spindle and relative to each other, a driving mechanism operatively connected to the driven shaft, means providing operative connection between one of the inertia members and the driving mechanism, and means providing operative connection between the other one of the inertia members and the driving mechanism, said inertia members having adjacent surfaces adapted to cause a resistance to relative rotation thereof when the space between said surfaces is filled with oil, whereby to provide a yieldable operative connection between a drive shaft and a driven shaft.

3. In an automatic transmission, a drive shaft, a driven shaft, a spindle solid on the drive shaft, a pair of inner inertia members having each member thereof positioned on opposite sides of the drive shaft and being adapted to rotate about the axis of the spindle, a pair of outer inertia members having each member thereof positioned on opposite sides of the drive shaft and being adapted to rotate about the axis of the spindle and with respect to the inner inertia members, a driving mechanism operatively connected to the driven shaft, means providing operative connection between the inner inertia members and the driving mechanism, and means providing operative connection between the outer inertia members and the driving mechanism.

4. In an automatic transmission, a drive shaft, a driven shaft, a spindle solid on the drive shaft, a pair of inner inertia members having each member thereof positioned on opposite sides of the drive shaft and being adapted to rotate about the axis of the spindle, a pair of outer inertia members having each member thereof positioned on opposite sides of the drive shaft and being adapted to rotate about the axis of the spindle and with respect to the inner inertia members, a driving mechanism operatively connected to the driven shaft, means providing operative connection between the inner inertia members and the driving mechanism, and means providing operative connection between the outer inertia members and the driving mechanism, said inertia members having adjacent surfaces between inner and outer inertia members adapted to cause a resistance to relative rotation thereof when the space between said surfaces is filled with oil.

5. In an automatic transmission, a drive shaft, a driven shaft, a spindle solid on the drive shaft, a pair of beveled gears positioned on one side of the drive shaft and being adapted to rotate about the axis of the spindle and relative to each other, a low gear mechanism operatively connected to the driven shaft including a beveled gear free to rotate on the drive shaft and meshed with one of the gears on the spindle, a higher gear mechanism operatively connected to the driven shaft including a beveled gear free to rotate on the drive shaft and meshed with the other one of the gears on the spindle, and means to provide a yieldable operative connection between the gears on the spindle.

6. In an automatic transmission, a drive shaft, a driven shaft, a spindle solid on the drive shaft, a pair of gears positioned on one side of the drive shaft and being adapted to rotate about the axis of the spindle and relative to each other, a low gear mechanism operatively connected to the driven shaft including a gear meshed with one of the gears on the spindle, a higher gear mechanism operatively connected to the driven shaft including the housing of the transmission as a rotary part thereof and a gear meshed with the other one of the gears on the spindle, and means to provide a yieldable operative connection between the gears on the spindle.

7. In an automatic transmission, a drive shaft; a driven shaft; an automatically variable gear transmission mechanism operatively connected to the drive shaft and to the driven shaft and having a differential mechanism adapted to provide a yieldable transmission of driving force and having a rotary means for transmitting power through said transmission mechanism in a high gear ratio when rotating forward, said mechanism being adapted to be forced to drive against heavy loads in a low gear ratio only when said rotary means is held from rotating backwards; and an automatic locking device to prevent said rotary means from rotating backwards when heavy loads are applied to the driven shaft.

8. In an automatic transmission, the combination as embodied in claim 7 wherein the rotary means provides the housing of the transmission.

9. In an automatic transmission, a drive shaft, a rotary housing; a low gear mechanism; a sliding internal gear locking mechanism provided with a gear adapted to be moved to a position of neutral and adapted to be moved to mesh with a gear of the low gear mechanism to lock the transmission in low gear; means for operating said locking mechanism from the exterior of the housing; exteriorly operative means for retarding rotation of the low gear mechanism with respect to the housing; and means providing a yieldable transmission of driving force between the drive shaft and the low gear mechanism.

10. In an automatic transmission, a drive shaft, a rotary housing; a low gear mechanism; a reverse gear mechanism; a sliding internal gear locking mechanism provided with a gear adapted to be moved to mesh with a gear of the low gear mechanism to lock the transmission in low gear, adapted to be moved to a position of neutral, and adapted to be moved to mesh with a gear of the reverse gear mechanism to lock the transmission in reverse; means for operating said locking mechanism from the exterior of the housing; exteriorly operative means for retarding rotation of the low gear and reverse gear mechanisms with respect to the housing; and means providing a yieldable transmission of driving force between the drive shaft and the low gear and reverse gear mechanisms.

11. In an automatic transmission, a drive shaft, a rotary housing; a low gear mechanism including a rotary part supported by the housing at one side of the drive shaft; a sliding internal gear locking mechanism provided with a gear adapted to be moved to a position of neutral and adapted to be moved to mesh with a gear of the low gear mechanism to lock the transmission in low gear; means for operating said locking mechanism from the exterior of the housing; an externally operative cone clutch operatively connected to said rotary part; and means providing a yieldable transmission of driving force between the drive shaft and the low gear mechanism.

12. In mechanism of the class described, relatively independent gear sets, each of said sets comprising intermeshed gears, and a revoluble inertia mass consisting of members carrying certain of said gears and supported to revolve in an orbital path about other of said gears, and other members rotatable relative to the aforementioned members and spaced apart therefrom sufficiently to provide a gap therebetween adapted to be filled with a friction inducing fluid.

13. In mechanism of the class described, relatively independent gear sets, each set comprising intermeshed gears, and an inertia mass operatively connected therewith and including a plurality of relatively rotatable members spaced apart from one another to provide for the accommodation of a frictional oil film therebetween when adjacent surfaces of the members are supplied with oil, whereby to retard motion of one member relative to the other and cause the leverage force derived therefrom in consequence of its retardation to be transferred to the other member and to effect actuation of said gear sets.

14. Means to retard the motion of a rotating inertia organization and for transmitting and utilizing the leverage force derived therefrom comprising, in combination, a plurality of relatively rotatable inertia members, said members being spaced with relation to each other so as to provide for the accommodation of a frictional oil film therebetween when their adjacent surfaces are filled with oil, each of said members including gear means, and a plurality of driving mechanisms including gear means intermeshed with the first said gear means so that when motion of one of the said inertia members is retarded, the leverage force derived therefrom will be transmitted to the other of said inertia members and to one of the respective driving mechanisms.

15. Mechanism of the class described comprising a plurality of relatively rotatable inertia members, said members being spaced apart from one another to provide for the formation of a frictional oil film therebetween when their adjacent surfaces are supplied with oil, so that when motion of one of said members is retarded a leverage force will be thereby set up and transferred to the other of said members, through said frictional oil film, and a plurality of driving mechanisms co-operable with the respective members and adapted to be influenced thereby during operation thereof.

16. In an organization of the class described, co-acting drive and driven shafts, respective gear trains co-operable with said shafts, and means for controlling actuation of said gear trains and for transmitting energy through said trains from the drive shaft in proportion to relatively varying loads placed upon the driven shaft, said means comprising an inertia mass including movable parts of said gear trains and co-ordinated so as to be influenced by the force of induced friction of a fluid when interposed between said parts.

17. In an organization of the class described, co-acting drive and driven shafts, respective gear trains co-operable with the drive shaft, and means for controlling actuation of said gear trains and including relatively movable inertia members carrying parts of the respective gear trains and the said inertia members being spaced apart from each other to provide for the formation therebetween of a frictional oil film when adjacent surfaces of said members are supplied with oil.

18. In an automatic transmission, a drive shaft, a driven shaft, a plurality of driving mechanisms operatively connected to said driven shaft, a differential mechanism operatively connected to the drive shaft and including separate means, each one of which is operatively connected to a separate one of the driving mechanisms and provided with surfaces adapted to co-act with mating surfaces of the other one of said means to produce resistance to relative motion thereof for causing said means to selectively and progressively act upon the driving mechanisms commensurate with the loads of relatively different proportions imposed upon said driven shaft.

19. In a transmission organization, drive and driven shafts, respectively, a driving mechainsm operatively connected to said driven shaft, and a differential mechanism operatively connected to the drive shaft and to said driving mechanism and including relatively rotatable parts having a gap therebetween adapted to accommodate a frictional oil film therein and thereby cause friction to be set up against adjacent surfaces of said parts.

20. In a transmission organization, drive and driven shafts, respectively, a plurality of driving mechanisms of respectively different gear ratios operatively connected to said driven shaft, a yieldable differential mechanism operatively connected to the drive shaft and to said driving mechanisms, a housing enclosing said mechanisms, and means for rendering one of said driving mechanisms having a higher gear ratio than another of said driving mechanisms inactive for a forward or reverse motion, said means being operative from the exterior of the housing.

21. In a transmission organization, a shaft, a second shaft, a high gear driving mechanism operatively connected to one of said shafts, a reverse gear driving mechanism operatively connected to the same shaft, a differential mechanism operatively connected to the other shaft and to said driving mechanisms, a housing enclosing all of said mechanisms, means to render said high gear driving mechanism inactive, and means to retard the motion of the reverse gear mechanism.

22. In a transmission organization, the combination as embodied in claim 21 wherein the housing is revoluble and constitutes part of the high gear driving mechanism.

23. In an automatic transmission, drive and driven shafts, respectively, a plurality of driving mechanisms operatively connected with said driven shaft, a differential mechanism operatively connected with the drive shaft and with said driving mechanism, said differential mechanism, in combination with said driving mechanism, including a plurality of sets of intermeshing bevel gears for selectively and progressively acting upon said driving mechanisms commensurate with the load imposed upon said driven shaft.

24. In an automatic transmission, the combination as embodied in claim 23 wherein the driving mechanisms are, respectively, of different gear ratios and wherein means are employed to provide a yielding drive between the respective sets of intermeshing bevel gears.

25. In a transmission organization, a shaft, a second shaft, and a variable gear transmission mechanism operatively connecting said shafts for relative changes of speed therebetween and including an inertia mass consisting of relatively rotatable parts having a gap therebetween for the accommodation of a friction inducing film when said parts are supplied with oil at their surfaces which define said gap, said mass being adapted for movement in an orbital path about the axis of one of the shafts, and means to compel said parts to rotate during the movement of the mass in said orbital path and at speeds commensurate with changes of speed occurring between said shafts.

26. In a transmission organization, a shaft, a second shaft, a variable gear transmission mechanism operatively connecting said shafts for relative changes of speed therebetween and including means on the first said shaft having revoluble inertia members, said inertia members having a gap therebetween for the accommodation of a frictional oil film, means for mounting said members for movement in an orbital path about the axis of the first shaft, and means to compel rotation of each member upon its axis and at a speed commensurate with changes of speed occurring between both shafts and including a driving mechanism having a part providing an operative connection between said members and the second shaft in one gear ratio, and a part providing an operative connection between said members and the second said shaft in a different gear ratio.

27. In a transmission organization, drive and driven shafts, respectively, a plurality of driving mechanisms operatively connected to said driven shaft, a differential mechanism operatively connected to the drive shaft and to said driving mechanisms and including relatively rotatable parts, said parts being spaced with relation to each other so as to provide a gap therebetween for the accommodation therein of a frictional oil film when the adjacent surfaces of said parts are filled with oil, and means to enforce a flow of oil between said adjacent surfaces.

28. In a transmission organization, a shaft, a second shaft, a rotary housing, a high gear driving mechanism operatively connected to said second shaft and including the aforementioned housing as a rotary part thereof, a low gear driving mechanism operatively connected to said second shaft, a differential mechanism operatively connected to the first mentioned shaft and to said driving mechanisms, and means to hold the housing stationary for producing resistance to relative motion of parts of the differential mechanism to retard actuation of the low gear driving mechanism with respect to the high gear driving mechanism.

29. In a transmission organization, drive and driven shafts, respectively, a forward driving mechanism operatively connected to said driven shaft and including the housing of the transmission as a rotary part thereof, a reverse driving mechanism operatively connected to said driven shaft, a yieldable differential mechanism operatively connected to the drive shaft and to said driving mechanism, and means to hold the housing stationary to retard a forward motion of the driven shaft when the transmission is in a condition of reverse drive.

30. In an automatic transmission, drive and driven shafts, respectively, an automatically variable gear transmission mechanism operatively connected to the drive shaft and to the driven shaft and including an element carrying relatively rotatable parts of said transmission mechanism, said parts being spaced with relation to each other so as to provide an intervening gap therebetween for a frictional oil film when the adjacent surfaces of said parts are filled with oil, said transmission mechanism and said parts being mounted to rotate with the drive shaft when operating at light loads.

31. In an automatic transmission, drive and driven shafts, respectively, a rotary high gear driving mechanism operatively connected to the driven shaft, a low gear driving mechanism operatively connected to the said driven shaft and including a rotary part supported by an element of the said high gear driving mechanism, a reverse gear driving mechanism operatively connected to said driven shaft and including a rotary part supported by an element of the said high gear driving mechanism, a differential mechanism operatively connected to the drive shaft and to each of the said driving mechanisms, a housing enclosing said mechanisms, and means for retarding and synchronizing the speed of the said rotary parts of the low gear and reverse gear driving mechanisms.

32. Means for yieldably transmitting power from one driving mechanism to another driving mechanism and for utilizing the leverage force thereof comprising, in combination, a plurality of driving mechanisms, a yieldable differential mechanism co-operable with the respective driving mechanisms and means for separately rendering the driving mechanisms respectively active and inactive so that when one of said driving mechanisms is in an inactive condition the leverage force derived therefrom will be transmitted through the differential mechanism and to the active driving mechanism.

33. Means for yieldably transmitting power from one driving mechanism to another driving mechanism and for utilizing the leverage force thereof comprising a plurality of driving mechanisms, a yieldable differential mechanism co-operable with the respective driving mechanisms, each of the said driving mechanisms and the said differential mechanism including gear means and the gear means of the respective driving mechanisms being intermeshed with the gear means of the said differential mechanisms to provide a yieldable operative gear train between the respective driving mechanisms, and means for separately rendering the driving mechanisms respectively active and inactive so that when one of said driving mechanisms is in an inactive condition the leverage force derived therefrom will be yieldably transmitted through the differential mechanism and to the active driving mechanism.

34. Means for utilizing the leverage action of a driving mechanism while the latter is held stationary and for simultaneously transmitting and utilizing the leverage force derived therefrom through a yieldable differential mechanism and to an active driving mechanism, comprising, in combination, a plurality of driving mechanisms, a yieldable differential mechanism co-operable with said driving mechanisms, separate means for holding each of the driving mechanisms stationary, said differential mechanism including relatively co-operable parts adapted to utilize a leverage force derived from one of the driving mechanisms when the latter is held stationary and to cause such leverage force to be transmitted through said differential mechanisms and to be utilized by the active driving mechanism.

35. Means for utilizing a friction inducing fluid for transmitting the leverage force derived from an inactive driving mechanism through a yieldable differential mechanism and to an active driving mechanism comprising, in combination, a plurality of driving mechanisms, a yieldable differential mechanism co-operable with said driving mechanisms, said differential mechanism including a number of relatively movable parts, said parts being spaced with relation to each other so as to accommodate a friction inducing fluid between their adjacent surfaces, means for separately rendering each of said driving mechanisms respectively active and inactive so that when one of said driving mechanisms is in an inactive condition, the leverage force derived therefrom will be transmitted to the active driving mechanism through said friction inducing fluid and said parts of the aforementioned differential mechanism.

36. In a transmission organization, a housing, a gear fastened to the housing, a shaft entering the housing through said gear, a yieldable differential mechanism operatively connected to said shaft and including a number of intermeshed gears, certain of said gears having intermeshing engagement with the gear of the housing, in combination with a plurality of driving mechanisms operatively connected by a gear system with the respective gears of the differential mechanism.

37. In a transmission organization, a shaft, a second shaft, a differential mechanism operatively connected to the first mentioned shaft and including a plurality of separate gear sets, a plurality of driving mechanisms operatively connected to the second mentioned shaft and to said differential mechanism, each of said driving mechanisms including a gear in intermeshing engagement with a set of gears of the said differential mechanism and all of said gears having freedom for rotation upon their axes.

38. In a transmission organization, a housing, a shaft entering said housing, a forward driving mechanism operatively connected with the shaft and including a rotary part supported by the housing, a reverse driving mechanism operatively connected with the aforementioned shaft and including a rotary part supported by the said housing, clutch means operatively connected with said rotary parts of the respective driving mechanisms, and means for actuating said clutch means to retard the motion of said driving mechanism.

39. In a transmission organization, a shaft, a plurality of driving mechanisms operatively connected with said shaft, each of said driving mechanisms including a rotary part, clutch means co-operable with said rotary parts, and means by which the clutch means can be actuated into engagement with said parts so as to retard or synchronize the movement of said driving mechanisms.

40. In a transmission organization, a housing, a shaft entering said housing, a driving mechanism operatively connected with said shaft and including a countershaft supported by the said housing, clutch means, co-operable with said countershaft, and means by which the clutch means can be actuated so as to engage said countershaft and thereby retard the said driving mechanism.

41. In a transmission organization, a housing, a shaft entering said housing, a driving mechanism operatively connected with said shaft and including a rotary part supported by the said housing, a clutch mechanism having one portion thereof carried by said housing and another part thereof carried by said rotary part, and means to actuate one portion of the said clutch mechanism into engagement with the other portion of the clutch mechanism and thereby retard or stop the rotation of the said driving mechanism.

42. In an automatic transmission, a housing adapted to rotate, a shaft entering said housing, a driving mechanism operatively connected with said shaft and including a rotary part, a clutch mechanism having one portion thereof carried by the said rotary part and another portion supported by the said housing, and means to actuate one portion of the said clutch mechanism into engagement with the other portion of the clutch mechanism and thereby retard or stop the rotation of the said driving mechanism.

EARL E. COTANCH.